(12) United States Patent
Gerlach et al.

(10) Patent No.: US 8,340,124 B2
(45) Date of Patent: Dec. 25, 2012

(54) METHOD AND SYSTEM FOR BANDWIDTH DETECTION

(75) Inventors: Heino Gerlach, Munich (DE); Adrian Schumacher, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 180 days.

(21) Appl. No.: 12/664,149

(22) PCT Filed: Dec. 11, 2008

(86) PCT No.: PCT/EP2008/010538
§ 371 (c)(1),
(2), (4) Date: Apr. 19, 2010

(87) PCT Pub. No.: WO2009/106116
PCT Pub. Date: Sep. 3, 2009

(65) Prior Publication Data
US 2010/0316170 A1    Dec. 16, 2010

(30) Foreign Application Priority Data
Feb. 26, 2008   (DE) .................. 10 2008 011 122

(51) Int. Cl.
*H04J 3/16* (2006.01)
(52) U.S. Cl. ........................... 370/468; 370/477
(58) Field of Classification Search .................. 370/319, 370/342, 344, 468, 477; 348/384.1–440; 375/240.1–240.29; 381/29
See application file for complete search history.

(56) References Cited

U.S. PATENT DOCUMENTS

| | | | |
|---|---|---|---|
| 2005/0265293 A1 | 12/2005 | Ro et al. | |
| 2007/0140115 A1 | 6/2007 | Bienas et al. | |
| 2008/0130612 A1* | 6/2008 | Gorokhov et al. | 370/342 |
| 2008/0219236 A1* | 9/2008 | Love et al. | 370/347 |
| 2010/0041410 A1* | 2/2010 | Englund et al. | 455/450 |

FOREIGN PATENT DOCUMENTS

| | | |
|---|---|---|
| DE | 198 54 252 A1 | 5/2000 |
| DE | 10337828 A1 | 4/2005 |
| DE | 10 2006 037 056 A1 | 2/2008 |
| EP | 1 811 712 A2 | 7/2007 |
| GB | 2 434 279 A | 7/2007 |
| WO | WO-2006/044489 A1 | 4/2006 |

OTHER PUBLICATIONS

International Search Report for PCT/EP2008/010538 dated Apr. 6, 2009.
Bangerter et al., "High-Throughput Wireless LAN Air Interface," *Intel. Tech. Jr.*, 7:47-57 (2003).
SIEMENS: "Considerations on E-UTRA Cell Search and Initial Access," document for discussion and decision, 44:1-4 (2006).

* cited by examiner

*Primary Examiner* — Mark Rinehart
*Assistant Examiner* — Mang Yeung
(74) *Attorney, Agent, or Firm* — Marshall, Gerstein & Borun LLP

(57) ABSTRACT

A method detects a bandwidth that is transmitted by a transmitter in a radio communications system, which is based on transmission frames. The transmission frames comprise a fixed time extension and a variable spectral extension. The transmission frames consist of a plurality of sub-units. Each sub-unit of the transmission frames contains a control channel, which is subdivided into two sub-control channels. The two sub-control channels are arranged at the spectral edges of the sub-units of the transmission frames. The transmitted bandwidth is investigated by determining the spectral extension of the transmission frame. The spectral extension of the transmission frame is determined by determining the spectral position of the sub-control channels in the sub-units of the transmission frames.

22 Claims, 3 Drawing Sheets

METHOD AND SYSTEM FOR BANDWIDTH DETECTION

BACKGROUND OF THE INVENTION

1. Field of the Invention

The invention relates to a method and a system for detecting the bandwidth of a signal transmitted by a transmitter, in particular, a mobile-radio device, especially for the LTE (Long Term Evolution) standard for fourth-generation mobile telephones.

2. Related Technology

Conventionally, in radio communications systems, one channel or a plurality of channels is/are allocated to mobile subscribers by a base station. The mobile subscriber can use exclusively this channel or these channels. If the mobile subscriber leaves the channel or the channels allocated to him, for example, by transmitting with a larger bandwidth, transmissions disposed in the adjacent frequency range are disturbed. This occurs if the mobile subscriber has either received the channel allocation incorrectly or is not responding correctly to the channel allocation. Such difficulties are normally not resolved specifically. Accordingly, a check on the channel allocation or a reallocation is implemented only when transmission difficulties are encountered, for example, through a lack of synchronization of the subscriber and the base station. An investigation of the bandwidth actually transmitted from the mobile subscriber is not implemented in this case. Accordingly, the base station determines that the mobile subscriber is transmitting with an incorrect bandwidth only after running through several unsuccessful reception procedures. The efficiency of the transmission is reduced as a result.

For instance, the patent application GB 2 434 279 A discloses a method for the allocation of resources to individual subscribers within a communications system. However, a monitoring of the observance of these allocated resources is not disclosed. The German published application DE 103 37 828 A1 discloses a method for selecting a transmission channel, on which a mobile user device transmits messages to a base station. Here also, a monitoring of the observance of the selected channel does not take place.

SUMMARY OF THE INVENTION

The invention is therefore based upon the object of providing a method and a system for detecting the bandwidth of a transmitted signal, which only requires low costs.

The invention provides a method for detecting the bandwidth transmitted by a transmitter within a radio communications system, wherein the radio communications system is based upon transmission frames, wherein the transmission frames comprise a fixed time extension and a variable spectral extension, wherein the transmission frames consist of a plurality of sub-units, wherein each sub-unit of the transmission frames contains a control channel, which is subdivided into two sub-control channels, wherein the two sub-control channels are disposed at the spectral edges of the sub-units of the transmission frames, wherein the transmitted bandwidth is investigated by determining the spectral extension of the transmission frame, wherein the spectral extension of the respective transmission frame is determined by determining the spectral positions of the sub-control channels in the sub-units of the transmission frames.

The invention also provides a detection system for detecting the bandwidth transmitted by a transmitter within a radio communications system, wherein the radio communications system is based upon transmission frames, wherein the transmission frames comprise a fixed time extension and a variable spectral extension, wherein the transmission frames consist of a plurality of sub-units, wherein each sub-unit of the transmission frames contains a control channel, which is subdivided into two sub-control channels, wherein the two sub-control channels are disposed at the spectral edges of the sub-units of the transmission frames, wherein the detection system investigates the transmitted bandwidth by determining the spectral extension of the transmission frame, and wherein the detection system determines the spectral extension of the respective transmission frame by determining the spectral positions of the sub-control channels in the sub-units of the transmission frames. Advantageous further developments form the subject matter of the dependent claims referring back to these claims.

The bandwidth, which is transmitted by a transmitter in a radio communications system, which is based on transmission frames, is detected. The transmission frames comprise a fixed time extension and a variable spectral extension. The transmission frames consist of a plurality of sub-units. Each sub-unit of the transmission frames contains a control channel, which is subdivided into two sub-control channels. The two sub-control channels are arranged at the spectral edges of the sub-units of the transmission frames. The transmitted bandwidth is investigated by determining the spectral extension of the transmission frame. The spectral extension of the transmission frame is determined by determining the spectral positions of the sub-control channels in the sub-units of the transmission frames. Accordingly, the bandwidth of the transmitted signal can be determined without additional communication. In this manner, only a very slight cost is required for the bandwidth detection. Furthermore, an unambiguous allocation of the transmitted signal to a given transmitter is possible in this manner.

At least in one sub-unit of the transmission frame, information is transmitted preferably by means of the control channel. The determination of the spectral extension of the transmission frame is preferably implemented during the transmission of information by means of the control channel.

A sub-unit of a transmission frame preferably consists of at least two slots. A slot is advantageously a time portion of a sub-unit of a transmission frame. During the first slot of the at least one sub-unit of the transmission frame, in which information is transmitted by means of the control channel, this information is preferably transmitted by means of the first sub-control channel. During the second slot of the at least one sub-unit of the transmission frame, in which information is transmitted by means of the control channel, this information is preferably transmitted by means of the second sub-control channel.

The sub-control channels advantageously comprise a fixed spectral extension. A very accurate investigation of the transmission signal bandwidth is possible in this manner.

A transmission frame advantageously consists of 2-20, particularly advantageously of 10 sub-units.

Information is advantageously transmitted on the control channel in exactly one sub-unit in every transmission frame. In this manner, only a small part of the total bandwidth is occupied by the control channel. This allows a high net data rate.

By preference, all sub-units of the transmission frames contain a data channel. In one sub-unit of the transmission frames, information is preferably transmitted either by means of the control channel or by means of the data channel. In this manner, an unambiguous distinction between the user data and control data is possible. The security of the transmission is improved as a result.

By preference, the bandwidth of the transmission frame is specified by a further transmitter within the radio communications system. The deviation of the bandwidth transmitted by the transmitter from the bandwidth specified by the further transmitter is preferably investigated. Accordingly, a monitoring of the observance of the specified bandwidth is possible without additional communication and the associated reduction in the bandwidth available for the user data.

The spectral position of the sub-control channels is preferably determined by means of correlation. Accordingly, a secure detection of the sub-control channels and therefore a secure determination of the bandwidth is possible.

BRIEF DESCRIPTION OF THE DRAWINGS

By way of example, the invention is described below on the basis of the drawings, in which an advantageous exemplary embodiment of the invention is presented. The drawings are as follows.

DETAILED DESCRIPTION

Initially, the structure and function of an exemplary transmission frame will be explained with reference to FIG. 1. The function of the method according to the invention will then be explained with reference to FIGS. 1-3. The presentation and description of identical elements in similar drawings has not been repeated in some cases.

Figure 1:
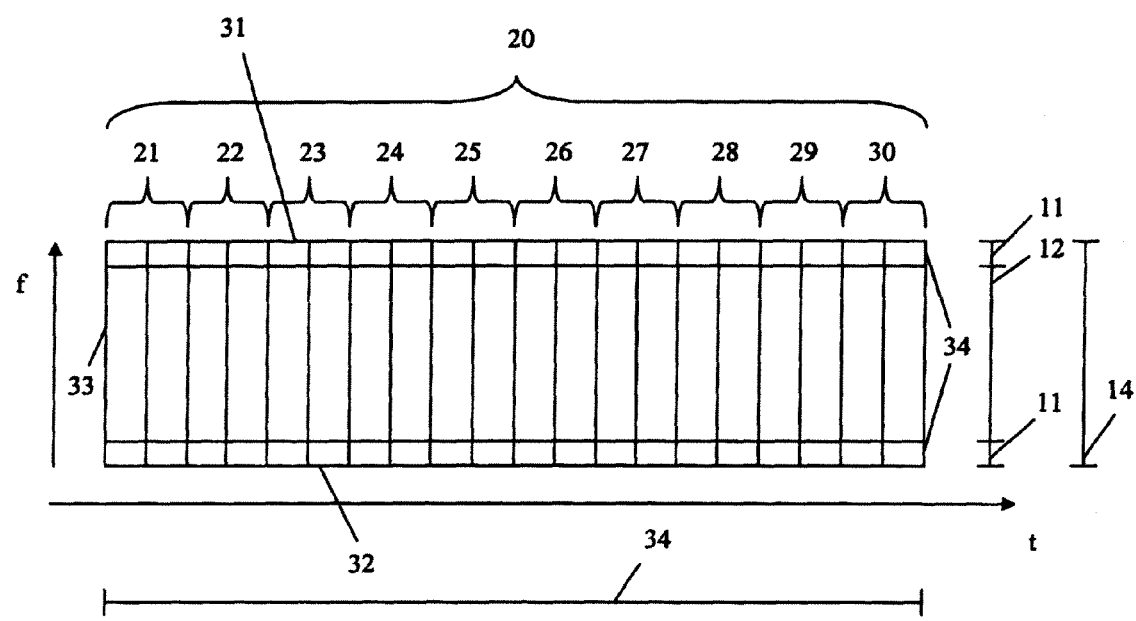
FIG. 1 shows an exemplary transmission frame.

FIG. 1 shows an exemplary transmission frame 20. In a communications system, messages based on transmission frames 20 are transmitted. A transmission frame 20 is a range defined by the time dimension and spectral dimension, within which messages can be transmitted. A transmission frame 20 comprises a fixed time extension 34 and a variable spectral extension 14. The spectral extension 14 of the transmission frame 20 is specified by a remote subscriber in the communication, for example, a base station within a mobile-radio system. The local subscriber in the communication, for example, a mobile-radio device, transmits its messages with the specified spectral extension 14.

A transmission frame consists of a plurality of sub-units 21, 22, 23, 24, 25, 26, 27, 28, 29, 30. Each sub-unit 21, 22, 23, 24, 25, 26, 27, 28, 29, 30 comprises a fixed time extension and a variable spectral extension 14, which corresponds to the spectral extension of the transmission frame 20. Moreover, each sub-unit 21, 22, 23, 24, 25, 26, 27, 28, 29, 30 comprises at least two slots. This will be described in greater detail on the basis of FIG. 2 and FIG. 3.

Each sub-unit 21, 22, 23, 24, 25, 26, 27, 28, 29, 30 further provides a data channel 33 and a control channel 34. The data channel is arranged spectrally between two sub-control channels 31, 32. The data channel 33 provides a variable spectral extension 12. The two sub-control channels 31, 32 provide a fixed spectral extension 11. Every variation of the spectral extension 14 of the transmission frame 20 is triggered by a variation of the spectral extension 12 of the data channel 33.

However, the transmitted spectral extension 14 of the transmission frames 20, can deviate from the specified spectral extension. This can occur, for example, through a transmission error of the specified spectral extension, or a deficient standard-conformity of a participating device. The method described in the section below is used to investigate the actually-transmitted spectral extension 14 of the transmission frames 20.

Figure 2:
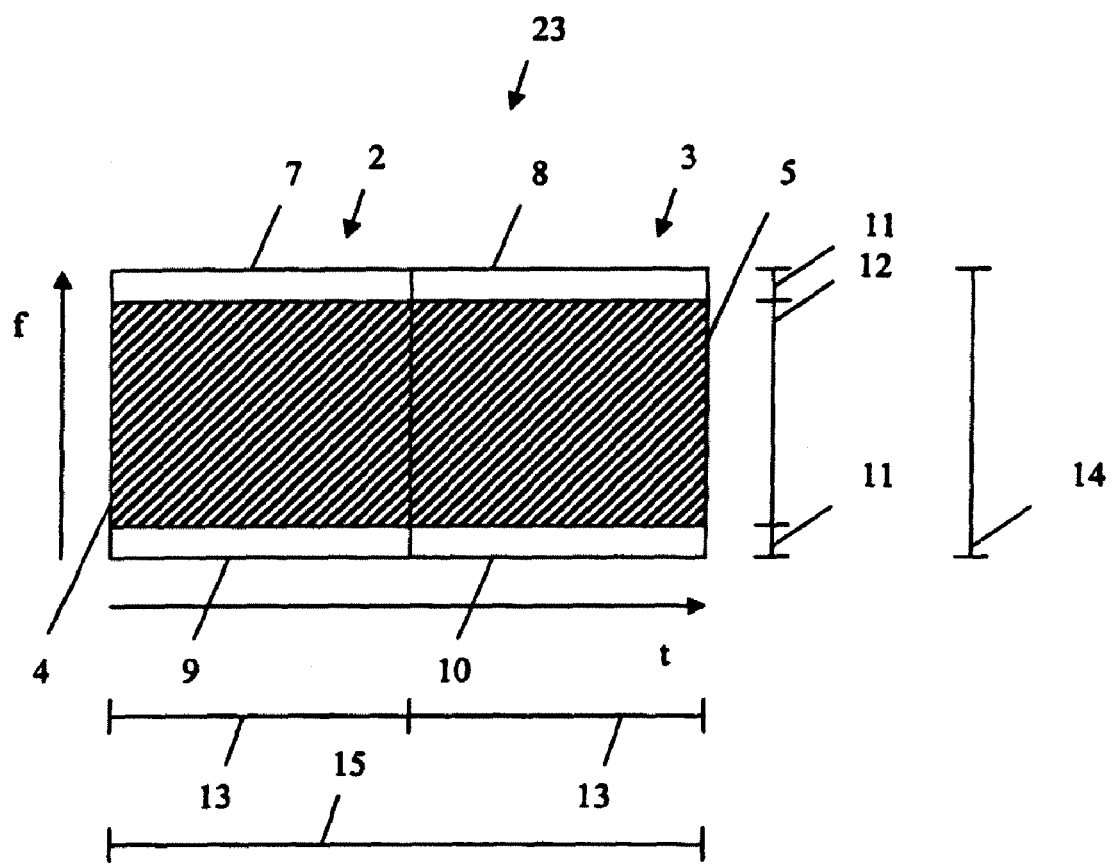
FIG. 2 shows a first exemplary sub-unit of a transmission frame.

In FIG. 2, a first exemplary sub-unit 23 of a transmission frame 20 is presented. The sub-unit 23 consists of two slots 2, 3. Each slot 2, 3 provides a fixed time extension 13 and a variable spectral extension 14. Each slot 2, 3 provides a data channel 4, 5 and two sub-control channels 7, 8, 9, 10. The sub-control channels 7, 8, 9, 10 are disposed spectrally above and below the data channel 4, 5. The spectral extension 11 of the two sub-control channels 7, 8, 9, 10 is fixed. The spectral extension 12 of the data channel 4, 5 is variable and dependent upon the spectral extension 14 of the transmission frame 20. In the sub-unit 23 of the transmission frame 20 shown here, data are currently transmitted only by means of the data channel 4, 5.

The spectral ranges provided as sub-control channels 7, 8, 9 10 remain unused. The majority of the sub-units 21, 22, 23, 24, 25, 26, 27, 28, 29, 30 of the transmission frame 20 provide this subdivision. Accordingly, for example, in 9 of 10 sub-units 21, 22, 23, 24, 25, 26, 27, 28, 29, 30 of the transmission frame 20, only the data channel 4, 5 is occupied, while the sub-control channels 7, 8, 9, 10 are unoccupied. In only one sub-unit 24 of the transmission frames 20 is the data channel 4, 5 unoccupied, and at the same time, the sub-control channels 7, 8, 9, 10 are occupied. A simultaneous occupation of the data channel 4, 5 and of the control channel in one sub-unit 21, 22, 23, 24, 25, 26, 27, 28, 29, 30 is not possible.

Figure 3:
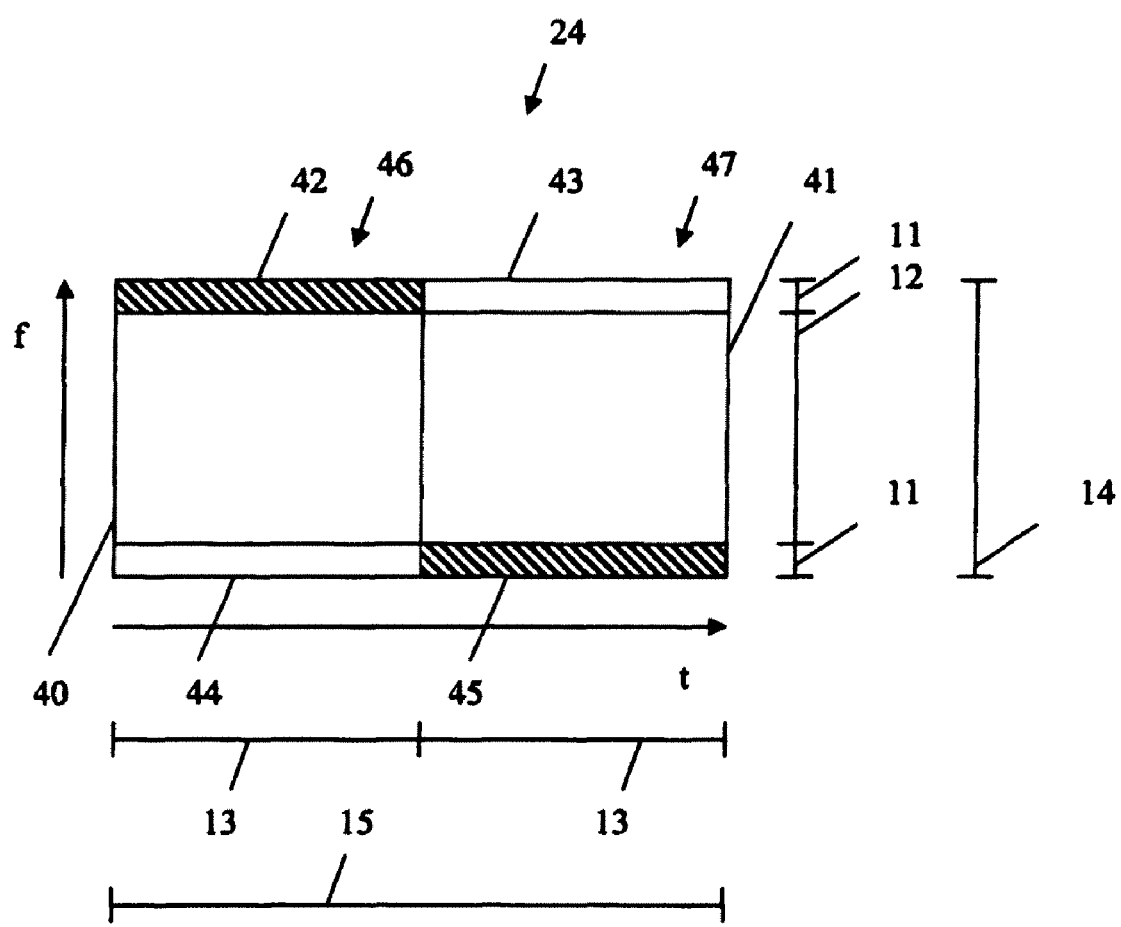
FIG. 3 shows a second exemplary sub-unit of a transmission frame.

FIG. 3 shows a second exemplary sub-unit 24 of the transmission frame 20. In this sub-unit 24, the illustrated case of the occupation of the sub-control channels 42, 43, 44, 45 is presented. The data channel 40, 41 is currently unoccupied. From this presentation, an alternating occupation of the two spectral parts 42, 43 and 44, 45 of the sub-control channels 42, 43, 44, 45 is evident. Accordingly, the sub-control channel 42 arranged spectrally above the data channel 40 is occupied in a first slot 46 of the sub-unit 24. The data channel 40 and the sub-control channel 44 arranged spectrally below the data channel 40 are not occupied. In a second slot 47, the sub-control channel 45 arranged spectrally below the data channel 41 is occupied, while the sub-control channel 43 disposed spectrally above the data channel 41 and the data channel 41 are not occupied.

On the basis of this alternating occupation of the sub-control channels 42, 43, 44, 45, the actually-used spectral extension 14 of the transmission frame 20 is now investigated. While the first slot 46 of a sub-unit 24 of the transmission frame 20 with occupied control channel is transmitted, the spectral position of the occupied sub-control channel 42 is investigated. The spectral extension 11 of the sub-control channel 42 is known. While the second slot 47 of a sub unit 24 of the transmission frame 20 with occupied control channel is transmitted, the spectral position of the occupied sub-control channel 45 is investigated. The spectral extension 11 of this sub-control channel 45 is also known.

Since the spectral position and the spectral extension 11 of the sub-control channels 42, 43, 44, 45 do not change over the course of one transmission frame 20, it is possible to draw conclusions from these with regard to all of the transmission frames 20. Following this, the entire spectral extension 14 of the transmission frame 20 is therefore investigated from the spectral position and the spectral extension 11 of the sub-control channels 42, 45. Accordingly, it can be determined, whether the actual transmitted spectral extension 14 of the transmission frame 20 agrees with the spectral extension provided. The length of a FFT (Fast Fourier Transformation) can be restricted accordingly.

The invention is not restricted to the exemplary embodiment presented. As already mentioned, for example, different radio communications standards can be used. A different subdivision of the transmission frames into sub-units and slots or into completely different portions is also conceivable. All of the features described above or the features illustrated in the drawings can be combined with one another as required within the framework of the invention.

The invention claimed is:

1. A method for detecting a bandwidth transmitted by a transmitter within a radio communications system, wherein the radio communications system is based upon transmission frames, the method comprising:
   investigating the transmitted bandwidth by determining the spectral extension of the transmission frame,
      wherein the transmission frames comprise a fixed time extension and a variable spectral extension, wherein the spectral extension of the data channel is variable and dependent upon the spectral extension of the transmission frame,
      wherein the transmission frames comprise a plurality of sub-units,
      wherein each sub-unit of the transmission frames contains a control channel, which is subdivided into two sub-control channels,
      wherein the two sub-control channels are disposed at the spectral edges of the sub-units of the transmission frames, and
      wherein determining the spectral extension of the respective transmission frame comprises determining the spectral positions of the sub-control channels in each of the sub-units of the transmission frames.

2. The method according to claim 1,
   comprising, at least in one sub-unit of a transmission frame, transmitting information by the control channel, and
   implementing the determination of the spectral extension of the respective transmission frame during the transmission of information by the control channel.

3. The method according to claim 2, wherein one sub-unit of a transmission frame comprises at least two slots,
   a slot is a time portion of a sub-unit of a transmission frame,
   during the first slot of the at least one sub-unit of the transmission frame, in which information is transmitted by the control channel, this information is transmitted by the first sub-control channel, and
   during the second slot of the at least one sub-unit of the transmission frame, in which information is transmitted by the control channel, this information is transmitted by the second sub-control channel.

4. The method according to claim 1, wherein the transmitter is a mobile communications device.

5. The method according to claim 1, wherein the sub-control channels comprise a fixed spectral extension.

6. The method according to claim 1, wherein a transmission frame comprises 2 to 20 sub-units, and information is transmitted on the control channel in exactly one sub-unit in every transmission frame.

7. The method according to claim 6, wherein all sub-units of the transmission frames contain a data channel,
   and, in one sub-unit of the transmission frames, information is transmitted either by the control channel or by the data channel.

8. The method according to claim 1, wherein the bandwidth of the transmission frames is specified by a further transmitter within the radio communications system.

9. The method according to claim 8, wherein the deviation of the bandwidth transmitted by the transmitter from the bandwidth specified by the further transmitter is investigated.

10. The method according to claim 1, wherein the spectral position of the sub-control channels is determined by correlation.

11. The method according claim 1, wherein a transmission frame comprises 10 sub-units, and
   information is transmitted on the control channel in exactly one sub-unit in every transmission frame.

12. A detection system comprising a detection device for detecting a bandwidth transmitted by a transmitter within a radio communications system, wherein the radio communications system is based upon transmission frames, characterized in that:
   the transmission frames comprise a fixed time extension and a variable spectral extension, wherein the spectral extension of the data channel is variable and dependent upon the spectral extension of the transmission frame,
   the transmission frames comprise a plurality of sub-units, each sub-unit of the transmission frames contains a control channel, which is subdivided into two sub-control channels,
   the two sub-control channels are disposed at the spectral edges of the sub-units of the transmission frames,
   the detection device investigates the transmitted bandwidth by determining the spectral extension of the transmission frame, and
   the detection device determines the spectral extension of the respective transmission frame by determining the spectral positions of the sub-control channels in each of the sub-units of the transmission frames.

13. The detection system according to claim 12, comprising, at least in one sub-unit of a transmission frame, transmitting information by the control channel, and
   implementing the determination of the spectral extension of the respective transmission frame during the transmission of information by the control channel.

14. The detection system according to claim 13, wherein one sub-unit of a transmission frame comprises at least two slots,
   a slot is a time portion of a sub-unit of a transmission frame,
   during the first slot of the at least one sub-unit of the transmission frame, in which information is transmitted by the control channel, this information can be transmitted by the first sub-control channel, and
   during the second slot of the at least one sub-unit of the transmission frame, in which information is transmitted by the control channel, this information can be transmitted by the second sub-control channel.

15. The detection system according to claim 12, wherein the transmitter is a mobile communications device.

16. The detection system according to claim 12, wherein the sub-control channels comprise a fixed spectral extension.

17. The detection system according to claim 12, wherein a transmission frame comprises 2 to 20 sub-units, and
   information can be transmitted on the control channel in exactly one sub-unit in every transmission frame.

18. The detection system according to claim 17, wherein all sub-units of the transmission frames contain a data channel,
   and, in one sub-unit of the transmission frames, information can be transmitted either by the control channel or by the data channel.

19. The detection system according claim 12, wherein the bandwidth of the transmission frames is specified by a further transmitter within the radio communications system.

20. The detection system according to claim 19, wherein the deviation of the bandwidth transmitted by the transmitter from the bandwidth specified by the further transmitter can be investigated.

21. The detection system according to claim 12, wherein the spectral position of the sub-control channels can be determined by correlation.

22. The detection system according to claim 12, wherein a transmission frame comprises 10 sub-units, and
 information can be transmitted on the control channel in exactly one sub-unit in every transmission frame.

* * * * *